United States Patent [19]

Kasahara

[11] Patent Number: 5,051,635
[45] Date of Patent: Sep. 24, 1991

[54] BALL-SPLINED SHAFT ASSEMBLY

[75] Inventor: Shin Kasahara, Tokyo, Japan

[73] Assignee: Nippon Thompson Co., Ltd., Tokyo, Japan

[21] Appl. No.: 457,450

[22] Filed: Dec. 27, 1989

[30] Foreign Application Priority Data

Dec. 28, 1988 [JP] Japan ................................. 63-329006

[51] Int. Cl.⁵ .............................................. H02K 7/06
[52] U.S. Cl. ........................................ 310/80; 310/20; 310/75 R; 310/98; 318/115; 318/35
[58] Field of Search .................... 310/80, 89, 49 R, 20, 310/37, 12, 13, 15, 75 R, 75 D, 96, 209, 122, 98, 101; 318/35, 135, 115; 74/89.15, 424.8 R; 901/24

[56] References Cited

U.S. PATENT DOCUMENTS

| 4,099,106 | 7/1978 | Nikaido | 318/115 |
| 4,346,728 | 8/1982 | Sulzer | 74/89.15 |
| 4,542,661 | 9/1985 | Teramachi | 74/424.8 R |
| 4,767,958 | 8/1988 | Sasaki | 3190/49 R |
| 4,831,290 | 5/1989 | Clauss et al. | 310/12 |
| 4,921,360 | 5/1990 | Rottermann | 384/44 |

FOREIGN PATENT DOCUMENTS 62-165057  6/1987  Japan .

Primary Examiner—Steven L. Stephan
Assistant Examiner—Edward To
Attorney, Agent, or Firm—Skjerven, Morrill, MacPherson, Franklin & Friel

[57] ABSTRACT

A ball-splined shaft assembly suitable for use in a robot arm or the like is provided. The assembly includes a shaft formed with a plurality of circumferential grooves spaced apart from one another at a predetermined pitch and a pair of longitudinal grooves which are located opposite sides and extend in parallel with the center line of the shaft. An outer sleeve unit fitted onto the shaft includes a pair of endless circulating paths each provided with a plurality of balls. Each of the endless circulating paths includes a load path section where the balls are partly exposed and thus received in the corresponding one of the longitudinal grooves. The outer sleeve unit is mounted on a housing through a pair of ball bearings. Thus, the shaft may rotate together with the outer sleeve unit relative to the housing and the shaft may move in its longitudinal direction relative to the outer sleeve unit and thus the housing. A stepping motor is mounted on the housing and operatively coupled to the outer sleeve unit. A linear step motor structure is formed in the housing and located in a side-by-side relation with the outer sleeve unit so that the shaft may be driven to move in its longitudinal direction by the linear step motor structure.

13 Claims, 6 Drawing Sheets

BALL-SPLINED SHAFT ASSEMBLY

BACKGROUND OF THE INVENTION

1. Field of the Invention

This invention generally relates to a ball-splined shaft assembly suitable for use in industrial robots, particularly in arm sections thereof, and, in particular, to a ball-splined shaft assembly having a driving mechanism so that its shaft may be driven to rotate as well as to feed.

2. Description of the Prior Art

A typical prior art ball-splined shaft assembly having a driving mechanism is illustrated in Pat. Laid-open Pub. No. 62-165057, in which grooves for a ball screw are formed in a ball-splined shaft and an outer cylinder of the ball screw and the driving mechanism (motor) are integrated to move the ball-splined shaft. With such a structure, however, the ball screw and the driving mechanism are mounted in a line along the longitudinal direction in order to limit the size in the radial direction, so that the size in the longitudinal direction necessarily tends to become larger. Besides, it requires an increased number of parts which tend to make its manufacture difficult and thus pushes up the cost. In addition, the linear motion accuracy tends to be impaired.

SUMMARY OF THE INVENTION

In accordance with the present invention, there is provided a ball-splined shaft assembly including a ball-splined shaft having a plurality of circumferential grooves spaced apart one from another at a predetermined pitch and at least one ball spline groove extending longitudinally in parallel with the center axis of the shaft. The assembly includes first means for holding the ball-splined shaft such that the shaft may move longitudinally relative to the holding means. The assembly also includes second holding means for holding the first holding means rotatably and first driving means for driving to rotate the first holding means relative to the second holding means. Also provided in the assembly is a second driving means for driving to move the shaft longitudinally relative to the first holding means.

In the preferred embodiment, the first holding means includes an outer sleeve unit which is formed with at least one endless circulating path in which a plurality of balls are provided and which is fitted onto the shaft with a predetermined clearance therebetween. Some of the balls in the endless circulating path of the outer sleeve unit are partly received in the ball spline groove of the shaft so that the shaft rotates in unison with the outer sleeve unit. The first driving means preferably includes a motor fixedly mounted on a housing of the assembly and a power transmission system, such as a belt, is provided between the motor and the outer sleeve unit. The second driving means preferably includes a line step motor which is fixedly mounted on the housing and juxtaposed with the outer sleeve unit. Through energization of the linear step motor, the shaft moves in its longitudinal direction step by step. In the preferred embodiment, the circumferential grooves which are associated with the linear step motor for longitudinal movement of the shaft are shallower than the ball spline groove which is associated with the outer sleeve unit for rotation of the shaft.

It is therefore a primary object of the present invention to provide an improved ball-splined shaft assembly.

Another object of the present invention is to provide an improved ball-splined shaft assembly having a driving mechanism compact in size and low at cost.

A still further object of the present invention is to provide an improved ball-splined shaft assembly having a driving mechanism which is high in linear motion accuracy.

DESCRIPTION OF THE PREFERRED EMBODIMENTS

Figure 1:
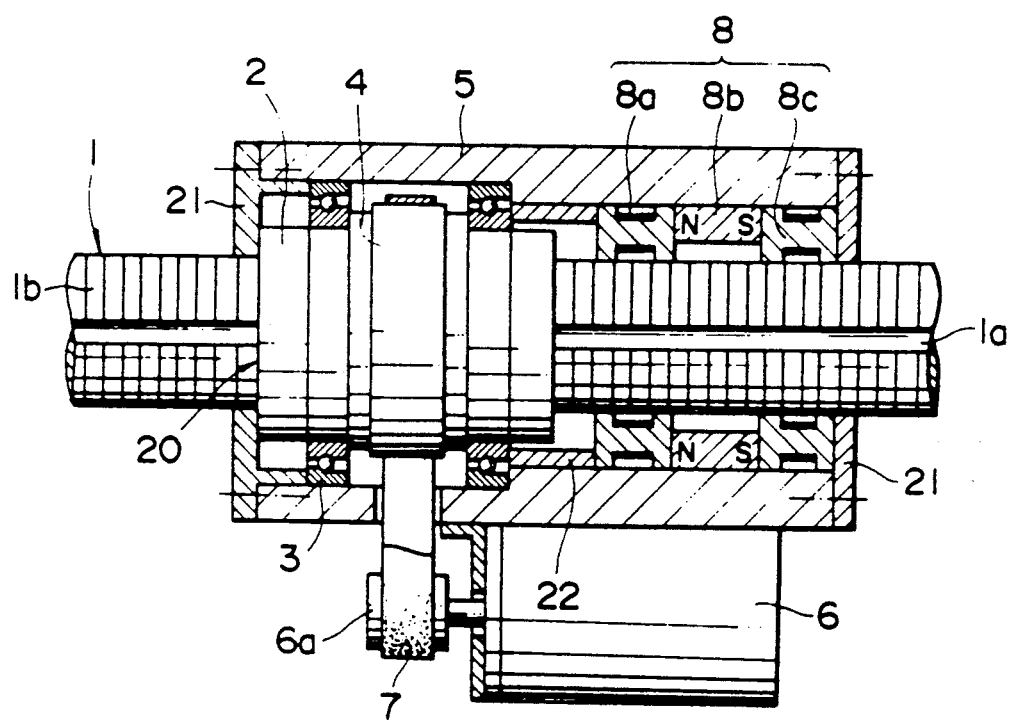
FIG. 1 is a schematic illustration showing partly in cross section a ball-splined shaft assembly constructed in accordance with one embodiment of the present invention.

Referring now to FIG. 1, there is schematically shown a ball-splined shaft assembly constructed in accordance with one embodiment of the present invention. As shown, the ball-splined shaft assembly includes a ball-splined shaft 1 which extends straight over a desired length and has a predetermined diameter. The shaft 1 is formed with a plurality of circumferential step grooves 1b preferably spaced apart from one another at a predetermined pitch. Also formed in the shaft 1 is a pair of spline grooves 1a which are located on opposite sides of the shaft 1 as extending in parallel with each other and with the center line of the shaft 1. In the preferred embodiment, the step grooves 1b are shallower in depth than the spline grooves 1a.

Figure 6:
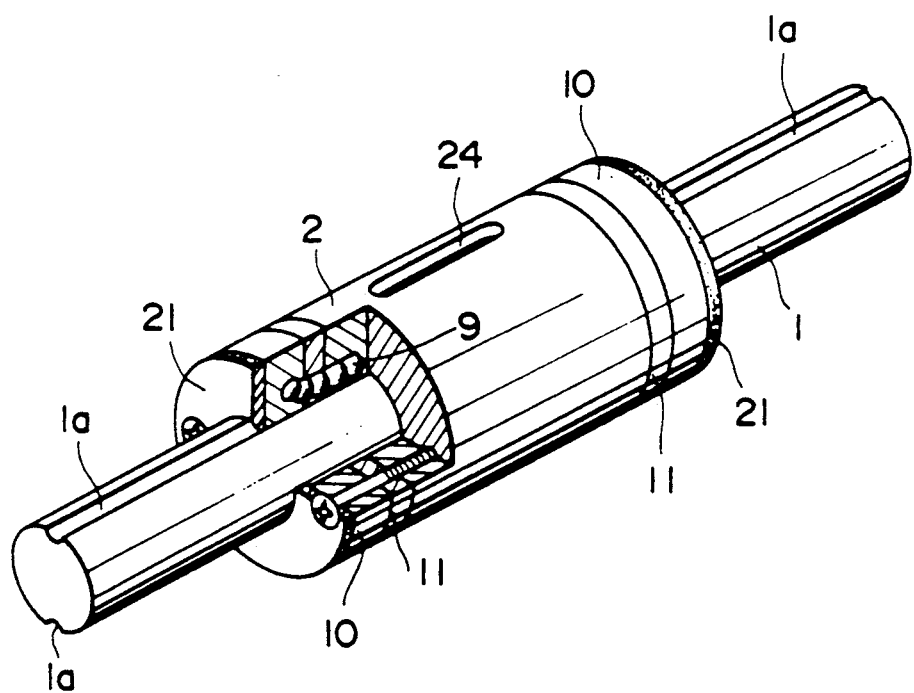
FIG. 6 is a schematic illustration showing in detail a spline coupling between the ball spline shaft and the outer sleeve unit which together define a part of the rotary section of the ball-splined shaft assembly.
Figure 7:
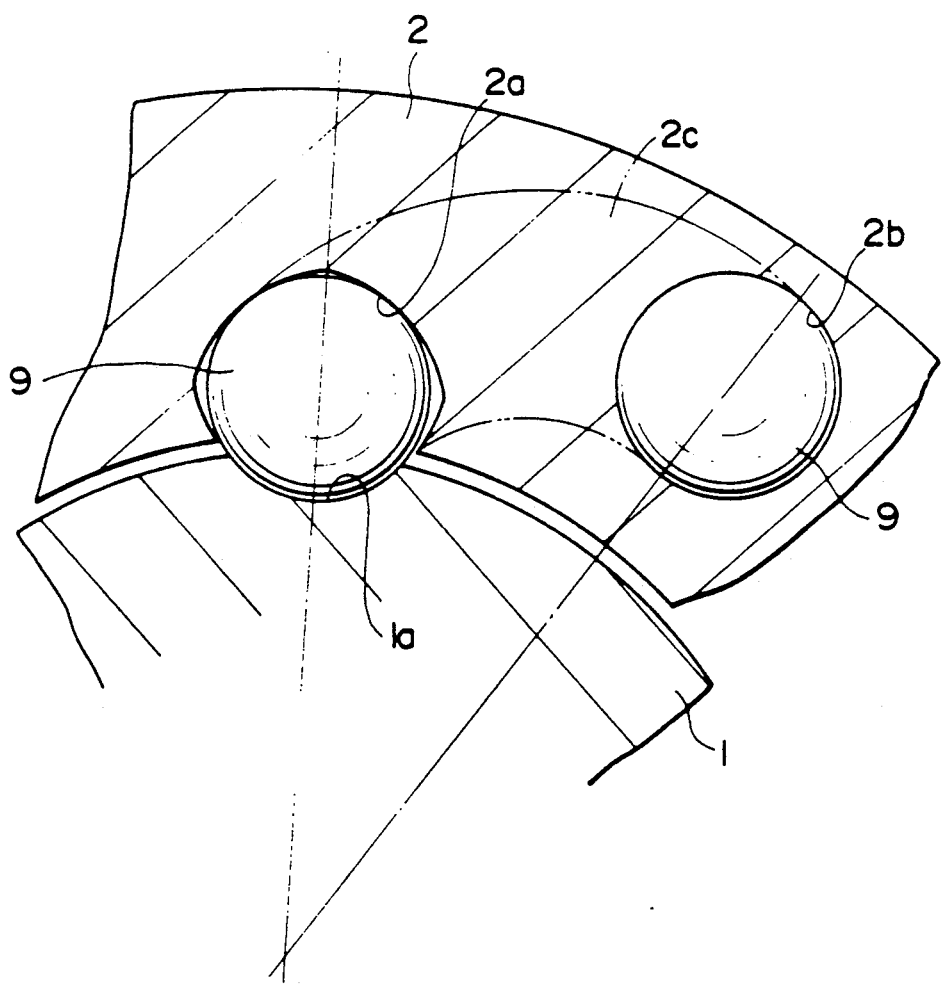
FIG. 7 is an illustration showing how the outer sleeve unit and the shaft are operatively coupled through balls which are provided in the endless circulating path formed in the outer sleeve unit and which are partly received in the spline groove formed in the shaft.

The present ball-splined shaft assembly also includes an outer sleeve unit 2 which is fitted onto the ball-splined shaft 1 with a predetermined clearance therebetween. The outer sleeve unit 2 is formed with a pair of endless circulating paths, each of which includes a load path section which is located opposite to the corresponding spline groove 1b when assembled. The endless circulating path also includes a curved path section which is connected to the both ends of the load path section. Each of the endless circulating paths is provided with a plurality of balls 9 as best shown in FIGS. 6 and 7, and, thus, those balls 9 which are located in the load path section of the endless circulating path are partly received in the corresponding spline groove 1a so that the outer sleeve unit 2 is operatively coupled to the ball-splined shaft 1 such that they rotate in unison while allowing the shaft 1 to move longitudinally relative to the outer sleeve unit 2.

The present assembly also includes a housing 5 which holds the outer sleeve unit 2 rotatably in position through a pair of ball bearings 3. As a result, the outer sleeve unit 2, together with the shaft 1, may rotate relative to the housing 5, and, the shaft 1 may move longitudinally relative to the outer sleeve unit 2 and thus the housing 5. A stepping motor 6 is fixedly mounted on the housing 5 and a timing belt 7 is extended between a pulley 4 fixedly mounted on the outer sleeve unit 2 and another pulley 6a fixedly mounted at one end of the motor shaft of the stepping motor 6. Thus, the outer sleeve unit 2 and thus the shaft 1 are driven to rotate by the stepping motor 6.

The present assembly also includes a linear step motor 8 which is located in a side-by-side relation with the outer sleeve unit 2 and which is also housed in the housing 5. That is, the linear step motor 8 is comprised of a pair of ring-shaped magnetic cores 8c and a ring-shaped magnet 8b which is sandwiched between the two cores 8c. As will be described later more in detail, the linear step motor 8 is operatively associated with the step grooves 1b of the shaft 1 to cause the shaft 1 to move in either direction longitudinally in a step-wise fashion.

Figure 2:
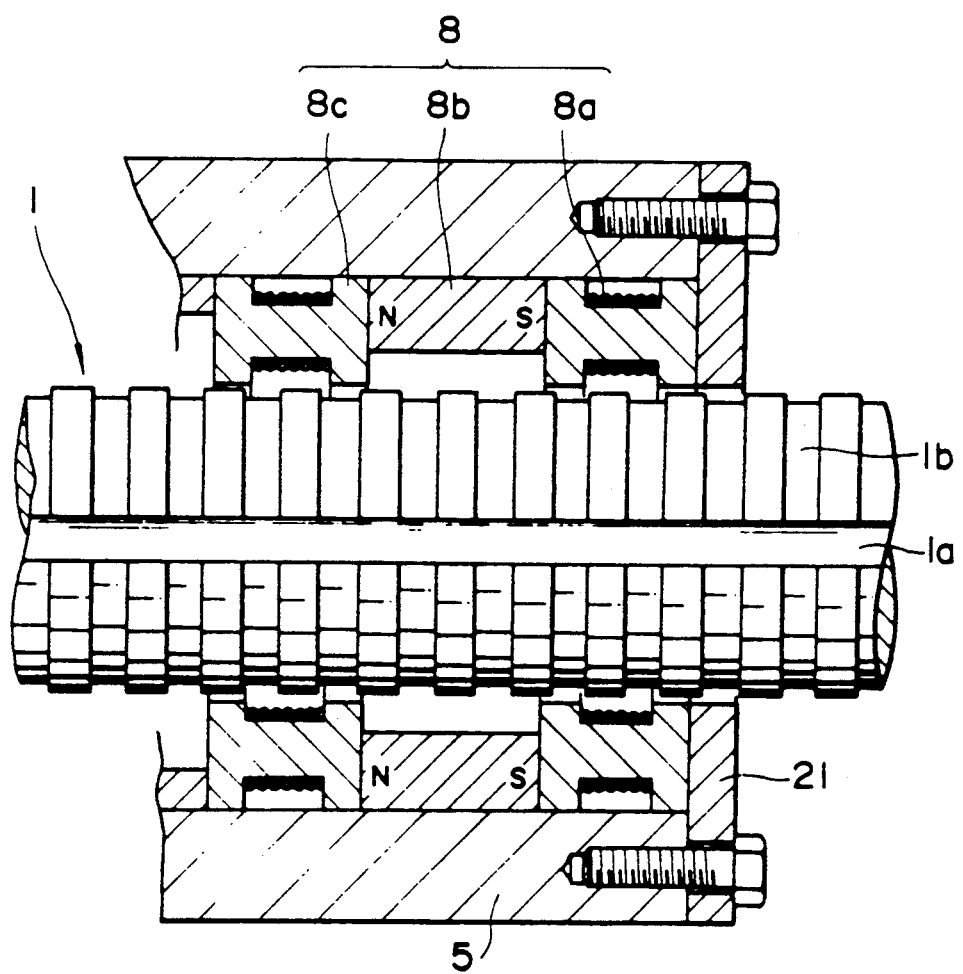
FIG. 2 is a schematic illustration showing on an enlarged scale the linear step motor section of the assembly shown in FIG. 1.

FIG. 2 illustrates on an enlarged scale the detailed structure of the section of the linear step motor 8 of the present assembly. As shown, each of the magnetic cores 8c is generally in the shape of a ring and has a pair of inner projections and an pair of outer projections, thereby defining a generally H-shaped cross section in its axial cross section. A coil 8a is wound around the central body portion of each of the magnetic cores 8c. With this structure, the direction of current passed through the coil 8a is reversed to change the polarity defined at the inner surfaces of the inner projections, thereby causing the shaft 1 to move in a desired direction. It is to be noted that the axial distance between the two inner projections of each of the cores 8c is set to be different from the pitch of the step grooves 1b. And, in the preferred embodiment, the width of the permanent magnet 8b is so sized that, when one of the four inner projections is radially aligned with a corresponding ridge formed between two adjacent step grooves 1b of the shaft 1, none of the remaining three inner projections of the cores 8c is radially aligned with ridges of the shaft 1. In this preferred embodiment, when the coils 8a are energized according to a two-phase energization scheme, the direction of current flowing through the coils 8a is switched in a sequence of different modes 1, 2, 3 and 4 so that the shaft 1 moves over a distance corresponding to ¼ pitch each mode, thereby completing one cycle by four modes. In this manner, the shaft 1 may move longitudinally relative to the housing 5 in a step-wise fashion in a desired direction. If desired, however, any other energization scheme may be used.

Figure 3:
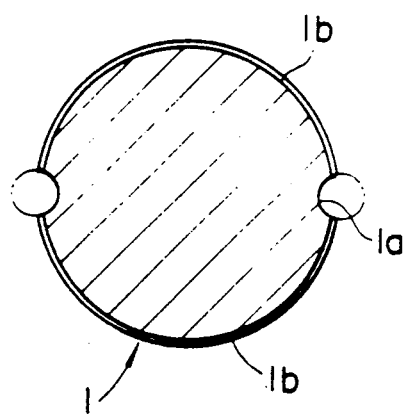
FIG. 3 is an illustration showing the cross section of the ball splined shaft provided in the assembly shown in FIG. 1.

FIG. 3 illustrates the location of the pair of spline grooves 1a. In the illustrated embodiment, the pair of spline grooves 1a are located on opposite sides of the shaft 1. It is to be noted, however, that the pair of spline grooves 1a may be located in any other positional relationship. In addition, only two spline grooves 1a are formed in the illustrated embodiment, any desired number of spline grooves 1a may be provided within the scope of the present invention. It should also be noted that, in the illustrated embodiment, the step grooves 1b are shallower than the spline grooves 1a and thus the spline grooves 1a are cut radially deeper into the body of the shaft 1.

Figure 4:
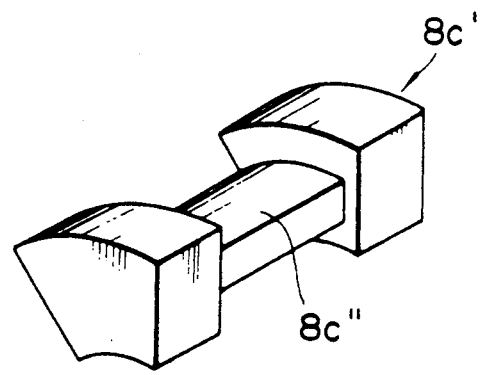
FIG. 4 is an illustration showing in perspective view the overall structure of a core element a plurality of which are assembled to define a core of the linear step motor section of the ball-splined shaft assembly.
Figure 5:
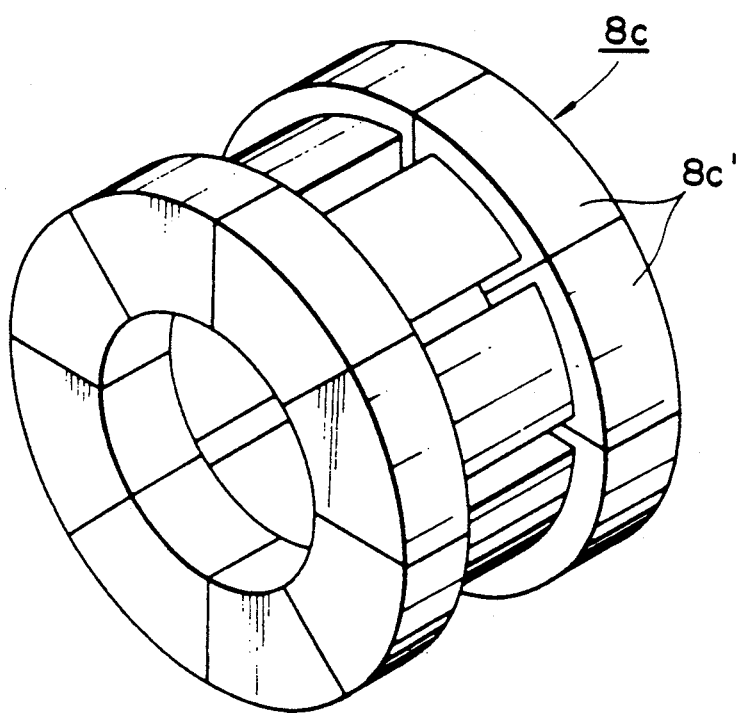
FIG. 5 is an illustration showing in perspective view the overall structure of a core which is defined by assembling a plurality of core elements one of which is shown in FIG. 5.

FIG. 4 illustrates a core element 8c which includes a pair of generally wedge-shaped end sections 8c' and a central bridge section 8c'' bridging between the pair of end sections 8c'. The core element 8c has a generally H-shaped cross section in an axial cross sectional plane. Each of the central bridge sections 8c'' is wound around by a coil 8a. FIG. 5 illustrates a core 8c which is constructed by assembling a plurality of core elements 8c, each having a coil 8c' wound around its central bridge section 8c'', in the form of a ring. The core 8c thus formed is placed inside the housing 5. One of the major factors which affect the accuracy of the linear step motor 8 is a clearance between the outer peripheral surfaces of steps or ridges formed between adjacent step grooves 1b of the shaft 1 and the inner peripheral surfaces of the inner projections of the core 8c. This clearance may be set highly accurately in accordance with the present invention.

FIGS. 6 and 7 illustrate an operative coupling between the outer sleeve unit 2 and the shaft 1. As described previously, the outer sleeve unit 2 is formed with a pair of endless circulating paths, each of which includes a load path section 2a and a return path section 2b and a pair of connecting path sections 2c each connecting the corresponding ends of the load and return path sections 2a and 2b. Thus, the balls 9 provided in the endless circulating path may roll along the path endlessly. The load path section 2a of the endless circulating path is located opposite to the corresponding spline groove 1a of the shaft 1 and extends generally straight in parallel with the spline groove 1a. And, the load path section 2a is formed with a window or slot which faces the corresponding spline groove 1a and which has a width at least slightly smaller than the diameter of the balls 9. Accordingly, the balls 9 are prevented from escaping from the endless circulating path through the window and the balls 9 are exposed partly through the window when located at the load path section 2a. Thus, those balls 9 which are located at the load path section 2a are partly received in the corresponding spline groove 1a of the shaft 1. Such an operative coupling between the outer sleeve unit 2 and the shaft 1 allows the shaft 1 to be integrated with the outer sleeve unit 2 as far as rotational motion is concerned while allowing the shaft 1 to move relative to the outer sleeve unit 2 in its longitudinal direction.

Figure 8:
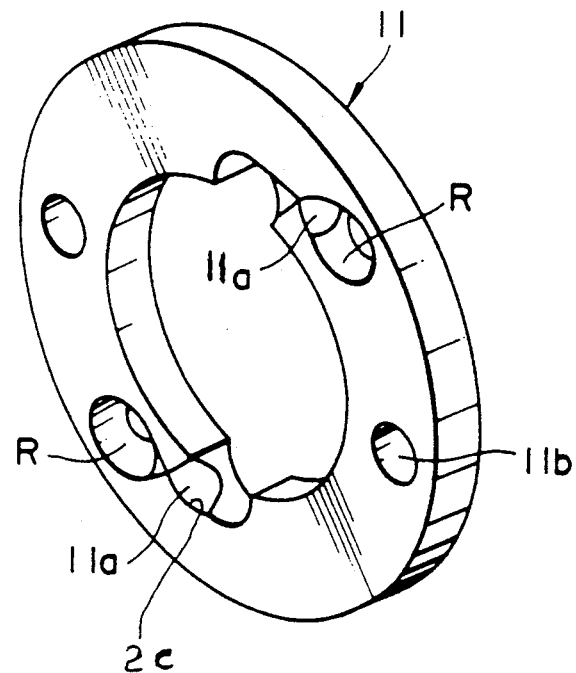
FIG. 8 is a schematic illustration showing in perspective view the overall structure of an intermediate plate which defines a part of the outer sleeve unit of the ball-splined shaft assembly.
Figure 9A:
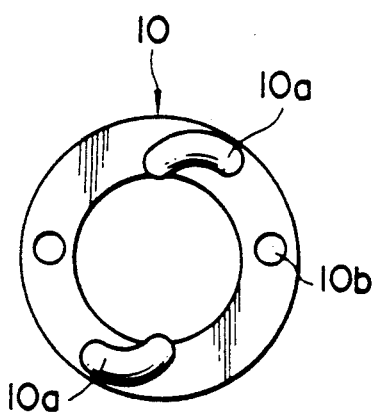
FIGS. 9a and 9b are schematic illustrations showing the structure of an end plate which defines a part of the outer sleeve unit of the ball-splined shaft assembly.
Figure 9B:
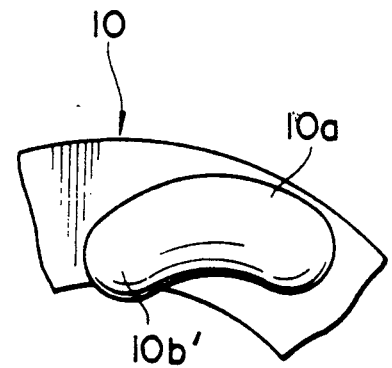

As best shown in FIG. 6, the outer sleeve unit 2 is comprised of a center sleeve, a pair of intermediate plates 11 each located at each end of the center sleeve, a pair of end plates 10 each located in contact with a corresponding intermediate plate 11 and a pair of seal plates 21 each located in contact with a corresponding end plate 10. As best shown in FIG. 8, the intermediate plate 11 is generally in the shape of a ring and it is formed with a pair of return path holes R, a pair of inner side walls 11a each of which defines a part of the curved connecting path section 2c and a pair of mounting holes 11b. As shown in FIGS. 9a and 9b, the end plate 10 is formed with a pair of recesses 10a which define the outer side walls of the respective curved connecting path sections 2c. Thus, when assembled, the inner walls 11a and the outer walls 10a are locate opposite to each other to thereby define a pair of curved connecting path sections 2c. A part of the recess 10a is formed with a tongue portion 10b for allowing balls 9 to be smoothly transferred between the load path section 2a and the curved connecting path section 2c. The end plate 10 is also formed with a pair of mounting holes 10b. Thus, the intermediate, end and seal plates 11, 10 and 21 may be bolted together to the center sleeve to thereby define the outer sleeve unit 2. As shown in FIG. 6, at least one key groove 24 is formed at the outer peripheral surface of the center sleeve so that the timing pulley 4 may be integrated with the outer sleeve unit 2 using a key. Besides, provision of the seal plates 21 is made so as to prevent any lubricant from leaking and any foreign matter from being introduced into the assembly. It should also be noted that the block of the center sleeve is formed with the load path section 2a and the return path section 2b.

It is to be noted that the above-described embodiment provides only one application of the present invention. There may be a variety of applications of the present ball-splined shaft assembly. In the above-described embodiment, use has been made of ball bearings 3, timing pulley 4, timing belt 7 and stepping motor 6; however, it is to be noted that this embodiment only illustrates one particular application for a robot arm and there may be any other applications of the present invention.

Advantages obtained from the present invention include the following. Since the outer sleeve unit is rotatably provided, linear motion as well as rotating torque can be transmitted using a single shaft. Since use of a ball screw as a means for driving a linear motion is not required, there can be provided a high-speed direct drive having a high linear motion accuracy without backlash and loss of motion. The present assembly may be manufactured significantly compact in size and low at cost. Since the linear stepping motor structure and the ball-splined shaft structure are formed on the same shaft, the clearance between the shaft and the core can be made uniform so that the accuracy of the motor may be increased.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A ball-splined shaft assembly comprising:
a shaft extending straight over a predetermined length, said shaft being formed with a plurality of circumferential grooves spaced apart from one another and at least one longitudinal groove extending in parallel with a central axis of said shaft;
first holding means for holding said shaft such that said shaft may be moved longitudinally relative to said first holding means in a first mode of operation along said at least one longitudinal groove, said first holding means being rotatable together with said shaft around the center axis of said shaft in a second mode of operation;
second holding means for rotatably holding said first holding means, said second holding means including a housing;
first driving means fixedly mounted with respect to said housing for driving and rotating said first holding means around the center axis of said shaft; and
second driving means mounted with respect to said housing for driving and moving said shaft in its longitudinal direction relative to said first holding means without rotation of said shaft.

2. The assembly of claim 1, wherein said plurality of circumferential grooves are shallower than said at least one longitudinal groove.

3. The assembly of claim 1, wherein said circumferential grooves extend orthogonally with respect to said at least one longitudinal groove.

4. The assembly of claim 1, wherein said first holding means includes an outer sleeve unit which is fitted onto said shaft with a predetermined clearance therebetween, said outer sleeve unit being formed with at least one endless circulating path which is provided with a plurality of balls and which includes a load path section located opposite to a corresponding one of said at least one longitudinal groove, wherein those balls located in said load path section are partly received in said corresponding longitudinal groove.

5. The assembly of claim 4, wherein said outer sleeve unit is formed with a window at the load path section, which window has a width slightly smaller than the diameter of said balls provided in said endless circulating path so that said balls are prevented from slipping away from said endless circulating path through said window and said balls are allowed to be partly exposed through said window.

6. The assembly of claim 5, wherein said shaft is formed with at least two longitudinal grooves which are located symmetrically with respect to the center line of said shaft.

7. The assembly of claim 4, wherein said second holding means includes a plurality of ball bearings which are interposed between said housing and said outer sleeve unit to thereby hold said outer sleeve unit from longitudinal movement while allowing said shaft and said outer sleeve unit to rotate with respect to said housing.

8. The assembly of claim 7, wherein said first driving means includes a stepping motor fixedly mounted on said housing and a power transmission system entrained between said stepping motor and said outer sleeve unit such that a driving power may be transmitted to said outer sleeve unit from said stepping motor.

9. The assembly of claim 8, wherein said power transmission system includes a timing belt which is extended between a pulley mounted on a motor shaft of said stepping motor and another pulley mounted on said outer sleeve unit.

10. The assembly of claim 4, wherein said second driving means includes a linear step motor structure mounted on said housing located in a juxtaposed relation with said outer sleeve unit.

11. The assembly of claim 10, wherein said step motor structure includes at least one core having a pair of inwardly projecting ridges, means for producing a magnetic flux flowing through said pair of inwardly projecting ridges and means for varying the direction of of said magnetic flux through said pair of inwardly projecting ridges, whereby the direction of said magnetic flux is varied periodically to have said shaft moved in its longitudinally direction in a step-wise fashion.

12. The assembly of claim 11, wherein said step motor structure includes a pair of generally ring-shaped cores and a generally ring-shaped permanent magnet sandwiched between said pair of cores, which are placed in an abutment relation and fitted onto said shaft, each of said cores being formed with a pair of inwardly projecting ridges to define a predetermined gap between the tip of said ridges and said shaft.

13. The assembly of claim 12, wherein a spacing between the pair of said inwardly projecting ridges is not equal to but has a predetermined relation with a pitch of a plurality of ridges formed between two adjacent ones of said circumferential grooves of said shaft.

* * * * *